US006442190B1

United States Patent
Nguyen

(10) Patent No.: US 6,442,190 B1
(45) Date of Patent: Aug. 27, 2002

(54) METHOD AND SYSTEM FOR SELF-ENCODING A SEQUENTIAL STRING OF DATA SYMBOLS FOR TRANSMISSION VIA COMMUNICATION SYSTEMS

(75) Inventor: Lim Nguyen, Omaha, NE (US)

(73) Assignee: The Board of Regents of the University of Nebraska, Lincoln, NE (US)

( * ) Notice: Subject to any disclaimer, the term of this patent is extended or adjusted under 35 U.S.C. 154(b) by 0 days.

(21) Appl. No.: 09/189,187

(22) Filed: Nov. 10, 1998

(51) Int. Cl.[7] .................... H04B 1/707; H04B 1/713
(52) U.S. Cl. .................. 375/141; 375/133; 375/135; 375/146
(58) Field of Search ................... 375/133, 135, 375/136, 141, 142, 146, 147, 150; 370/320, 342

(56) References Cited

U.S. PATENT DOCUMENTS

| | | | |
|---|---|---|---|
| 4,597,087 A | 6/1986 | Kadin ........................ 375/1 |
| 4,606,041 A | 8/1986 | Kadin ........................ 375/1 |
| 4,651,327 A | 3/1987 | Fujita ........................ 375/1 |
| 4,901,307 A | 2/1990 | Gilhousen et al. .......... 370/18 |
| 5,048,052 A | * 9/1991 | Hamatsu et al. .......... 375/151 |
| 5,073,899 A | 12/1991 | Collier et al. ............ 375/1 |
| 5,090,023 A | 2/1992 | Watanabe et al. .......... 375/1 |
| 5,121,408 A | 6/1992 | Cai et al. ................. 375/1 |
| 5,130,987 A | 7/1992 | Flammer ................... 370/103 |
| 5,260,967 A | 11/1993 | Schilling ................... 375/1 |
| 5,335,249 A | * 8/1994 | Krueger et al. .......... 375/149 |
| 5,343,494 A | 8/1994 | Averst et al. ............ 375/1 |
| 5,410,568 A | 4/1995 | Schilling ................... 375/205 |
| 5,467,368 A | 11/1995 | Takeuchi et al. .......... 375/206 |
| 5,479,442 A | * 12/1995 | Yamamoto ................. 375/150 |
| 5,495,509 A | 2/1996 | Lundquist et al. ........ 375/367 |
| 5,572,514 A | * 11/1996 | Miyake .................... 370/248 |
| 5,598,429 A | 1/1997 | Marshall ................... 375/210 |
| 5,619,527 A | * 4/1997 | Kuroyanagi et al. ....... 375/147 |
| 5,642,397 A | * 6/1997 | Agbaje-Anozie .......... 370/313 |
| 5,689,525 A | 11/1997 | Takieshi et al. ........... 375/206 |
| 5,745,522 A | 4/1998 | Heegard ................... 375/208 |
| 5,757,853 A | 5/1998 | Tsujimoto ................. 375/200 |
| 5,796,774 A | * 8/1998 | Kato ....................... 375/146 |
| 5,838,717 A | * 11/1998 | Ishii et al. ............... 375/131 |
| 6,061,342 A | * 5/2000 | Tsubouchi et al. ......... 370/342 |
| 6,061,386 A | * 5/2000 | Molev-Shteiman ........ 375/140 |
| 6,252,898 B1 | * 6/2001 | Eto et al. ................ 375/130 |
| 6,272,121 B1 | * 8/2001 | Smith et al. .............. 370/342 |
| 6,282,181 B1 | * 8/2001 | Stark et al. .............. 370/335 |
| 6,314,128 B1 | * 11/2001 | Bunker et al. ............ 375/149 |

* cited by examiner

Primary Examiner—Young T. Tse
(74) Attorney, Agent, or Firm—James D. Welch

(57) ABSTRACT

Disclosed is a method of "self-encoding" data symbols for transmission over spread-spectrum, (eg. (CDMA), (FDMA)), communication systems which utilizes encountered data symbols, in a sequence of data symbols, to develop data symbol energy spreading codes which are applied to encode subsequently encountered data symbols. The method includes decoding each encoded data symbol after it is transmitted to a receiver in the spread-spectrum communication system.

13 Claims, 2 Drawing Sheets

METHOD AND SYSTEM FOR SELF-ENCODING A SEQUENTIAL STRING OF DATA SYMBOLS FOR TRANSMISSION VIA COMMUNICATION SYSTEMS

TECHNICAL FIELD

The present invention relates to the encoding of symbolic data, and more particularly is primarily a method of "self-encoding" data symbols for transmission over a spread-spectrum communication system such as code-division-multiple-access (CDMA) or frequency-division-multiple-acess (FDMA) communication systems. Said method comprises utilization of encountered data symbols in a sequence of data symbols, to develop data symbol energy spreading codes which are applied to encode subsequently encountered data symbols. Said method further includes decoding each encoded data symbol, after it is transmitted over a communications transmission system.

BACKGROUND

Both the telecommunications Industry and the military are very interested in efficient wireless electronic communication systems which maximize the number of users simultaneously served, in available bandwidth. For instance, the telecommunications industry has special interest in efficient wireless and mobile systems for application in multi-user cellular systems, and the military is particularly interested in wireless communication systems which are secure in hostile environments, have a low probability of detection, and which are not subject to being easily jammed.

Continuing, typical electronic communication systems provide a frequency bandwidth within which a multiplicity of individual communication signals are transmitted. Many well known communication systems utilize a frequency allocation approach such as frequency-division-multiplexed (FDM), wherein an available frequency bandwidth is divided into specific smaller bands, called channels, which channels are separated from one another by guard-bands. Likewise, time-division-multiplexed (TDMA) communication systems divide a period of time into a number of specific slots which sequentially carry different individual communications. In use each said channel typically carries a signal specific to a single user only. Alternative communication systems provide that a multiplicity of users simultaneously be provided access to an entire available bandwidth, and that each user's signal be somehow encoded so that it can be later selected out from all co-present signals. Such communications systems utilize an approach which is known as "Spread-Spectrum", including for instance, code-division-multiple-access (CDMA)). It is well known then that spread spectrum communication systems operate by allowing many users to share a relatively large common bandwidth in an electronic communication system in conjunction with encoding techniques such as Code Division Multiple Access (CDMA), instead of providing many separate smaller bandwidth channels, each of which carries a single user's communication, as in (FDM).

It is noted at this point that the present invention finds primary, but not limiting, application in code-division-multiple-access (CDMA) based spread-spectrum communications systems. In that light, and as will be appreciated by those skilled in the art, it is noted that conventional wireless code-division-multiple-access (CDMA) spread spectrum electronic communication systems are designed according to the IS-95 standard for cellular telephony and personal communication services (PCS), and use Walsh Codes and m-sequences for mobile channels. Such systems presently provide that original data symbols input thereto be encoded by a method which is mediated by use of a pre-generated, determined, psuedo-random code, (rather than by a "self-encoding"approach), to encode original data symbols at a transmitter, and to decode spread spectrum data symbol chips, (which were encoded utilizing said pre-generated determined psuedo-random code) at a receiver. Said psuedo-random code generation is typically achieved by expansion of a same "data key" at both transmitter and receiver locations prior to use thereof. Said psuedo-random codes generated at the transmitter and receiver are, prior to use, synchronized, and said transmitter and receiver respectively serve to direct the conversion of each of M encountered data symbols into N encoded spread spectrum data symbol chips, and re-constitution of said N encoded spread spectrum data symbol chips into the M original data symbols.

With an eye to the present invention a Search of Patents was performed which focused on use of Data to encode itself in Spread Spectrum and particularly in CDMA communication system settings, with the result of said search being that very little was found.

U.S. Pat. No. 5,343,494 to Averst et al., describes a method for receiving and processing data in a portable transceiver which involves receiving at least one information signal; decoding the at least one information signal to recover information therein; generating a plurality of pseudo-noise (PN) sequences in accordance with the information wherein each of the plurality of PN sequences is indicative of a predetermined response. The Disclosure of the 494 Patent makes it clear that "generating a plurality of pseudo-noise (PN) sequences in accordance with the information" is to be interpreted in light of selecting one of a plurality of base station (PN) sequences so that lesser strength base station signals do not interfere. It is noted that the 494 Patent does not remotely describe reforming a transmitter spreading code with each new input symbol, to ready it for application in spreading a sequentially following data symbol, with a reverse operation applied at the receiver.

U.S. Pat. No. 5,757,853 to Tsujimoto describes using a plurality of spreading and de-spreading codes to the end that multipath fading and the like are overcome.

U.S. Pat. No. 5,467,368 to Takeuchi et al., (Col. 3, Line 67), alludes to the concept of using different spreading codes for different symbols in a sequence of symbols, however such is In the context of using a spreading code that is greater in length than the data symbols.

U.S. Patent No. 4,597,087 to Kadin describes producing first and second pseudo-noise (PN) code streams time displaced with respect to each other, and use thereof to encode data by groupings of randomly occurring frequencies and spacings therebetween. The 087 Patent also use of a frequency hopping rate equal to n times the rate of binary data being transmitted. Said 007 Patent, however, does not describe a technique of producing a (PN) code on a data symbol by symbol basis, for use in encoding subsequent data symbols.

U.S. Pat. No. 5,073,899 to Collier et al., (in Col. 3, Line 65 and thereafter), states that a pseudo-random code can be changed regularly or at irregular intervals. It describes application to pages of text. Said 899 Patent, however, provides for inclusion of a synchronization signal in a modulated signal as easily gleened from claim 1 therein.

U.S. Pat. No. 4,651,327 to Fujita describes a technique by which need for a synchronization signal can be avoided.

U.S. Pat. No. 5,495,509 to Lundquist et al., describes use of a short preamble (PN) code sequence to allow synchronization.

A lengthy Patent to Flammer, U.S. Pat. No. 5,130,987 focuses synchronization, but of information in a packet communication format on a plurality of frequencies without use of a central timing source.

U.S. Pat. No. 5,689,525 to Takeishi et al., describes generating a (PN) code based upon a delayed clock signal.

U.S. Pat. No. 5,745,522 to Heegard mentions a shift register and use of XOR to produce a pseudo-random noise sequence, operating on a byte by byte basis. Somewhat similar invention(s) is/are described in U.S. Pat. Nos. 5,410, 586 & 5,260,967 to Schilling.

Additionally, a Patent to Gilhousen et al., (assigned to QUALCOMM), U.S. Pat. No. 4,901,307, was provided by the Searcher, as were Patents to Kadin, No. 4,606,041; Takeuchi et al., U.S. Pat. No. 5,467,368; U.S. Pat. No. 5,410,568 to Schilling; U.S. Pat. No. 5,260,967 to Schilling; U.S. Pat. No. 5,598,429 to Marshall; Patent U.S. Pat. No. 5,090,023 to Watanabe et al.; and U.S. Pat. No. 5,121,408 to Cai et al.

In addition, non-Patent references which are relevant and which are incorporated hereinto by reference for general background are:

"A Mathematical Theory of Communication", Bell System Technical Journal, 27, pp. 379–423 and 623–656, (1948);

"Spread Spectrum Systems", R.C. Dixon, John Wiley & Sons, (1984);

"CDMA: Principals of Spread-Spectrum Communication", A.J.

Viterbi, Addison-Wesley, (1995);

"Multiple Access Communications, Foundations for Emerging Technologies", N. Abramson, pp. 219–226, IEEE Press (1993); and "Crosscorrelation Properties of Psuedo-Random and Related Sequences", D. V. Sarwate & M. B. Pursley, Proceedings of the IEEE, 68, pp 593–619 (May 1980).

In view of the known prior art, it is evident that the application of encountered symbolic data to continuously change a data symbol energy spreading code utilized to encode, and subsequently decode, sequentially encountered symbolic data, has not previously been reported in the context of spread-spectrum communications systems, and particularly in the context of (CDMA) communications systems and methods.

DISCLOSURE OF THE INVENTION

In contrast to Spread Spectrum, and in particular (CDMA) communication systems, described in known prior art, the present invention is primarily a method of practicing spread spectrum communication which comprises the transformation of a sequence of M original data symbols into a sequence of M "self-encoded" spread spectrum data symbols, wherein each of said self-encoded spread spectrum data symbols comprises N data symbol chips of +1, −1, (or 0) magnitude under one typical approach, and of varying frequencies in a "frequency-hopping" approach. The present invention method further comprises transmitting the resulting sequence of said N self-encoded spread spectrum data symbol chips, and the receiving and sequential re-constitution of each of said N self-encoded spread spectrum data symbol chips, into a sequence of M original data symbols at said receiver.

The present invention method of encoding original data symbols-differs from said methods practiced by said known spread a spectrum communication systems in that a determined psuedo-random code is not necessarily, (but can be), pre-generated at either the transmitter or receiver, but a dynamic data symbol energy spreading "encoding sequence" is continuously generated at the transmitter side of a spread spectrum communication system based on information original data symbol content, on an original data symbol by original data symbol basis. Said generated dynamic encoding sequence also is continuously provided at the receiver side of the spread spectrum communication system as an additional operation to the re-constitution of said original data symbols from received self-encoded data symbols. As will become clear supra herein, this assumes that a first encoding sequence of N elements is provided to both the transmitter and receiver by, for instance, a synchronizing hand-shake technique so that a first symbol can be converted into N data symbol chips by use thereof at the transmitter, and re-constituted at the receiver. (Note, "hand-shaking" is a non-limiting example of an applicable functional technique. Use of other techniques which perform a similar function to a "hand-shake" are within the scope of the present invention).

A simple present invention method of transforming a series of two (2) original data symbols into a sequence of two (2) self-encoded spread spectrum data symbols, each of which is comprised of a sequence of N data symbol chips, comprises the providing of a sequence of two original data symbols comprising a first original data symbol followed by a sequentially second original data symbol. This is accompanied by providing a means for containing N code elements, said means for containing N code elements having an input code element containing means and an output code element containing means with (N−2) additional code element containing means being sequentially present there-in-between. Said means for containing N code elements is initially loaded with an initial code comprising a sequence of N code elements, one said code element being present in each of said N code element containing means. Said means for containing N code elements is capable of shifting a code element present in a code element containing means Into an adjacent code element containing means toward said output code element containing means, and ejecting a code element present in said output code element containing means. The next step requires multiplying the first of said two original data symbols by said initial N code elements present in said means for containing N code elements, to provide a sequence of N first data symbol chips. Next a code element is derived from said first of said two original data symbols and entered to said input code element containing means in said means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements. The sequentially second of said two original data symbols is then multiplied by code elements present in the means for containing N code elements to provide a sequence of N data symbol chips for said sequentially next of said two original data symbols. The end result being that a sequence of two (2) self-encoded spread spectrum data symbols are developed, each being comprised of a sequence of N data symbol chips.

Another simple present invention method of transforming a series of two (2) original data symbols into a sequence of two (2) self-encoded spread spectrum data symbols, each of which is comprised of a sequence of N data symbol chips, comprises the providing a pseudo-random sequence of numbers, and providing a sequence of two (2) original data symbols comprising a first original data symbol followed by a sequentially second original data symbol. Accompanying, a means for containing N code elements, said means for containing N code elements having an input code element containing means and an output code element containing means with (N−2) additional code element containing means being sequentially present there-in-between is provided. Said means for containing N code elements is initially loaded with an initial code comprising a sequence of N code elements, one said code element being present in each of said N code element containing means, said means for containing N code elements being capable of shifting a code element present in a code element containing means into an adjacent code element containing means toward said output code element containing means, and ejecting a code element present in said output code element containing means. Next an optional step of applying said initial code comprising a sequence of N code elements to said pseudo-random sequence of numbers to provide a modified initial code comprising a sequence of N code elements can be performed. This is followed by multiplying the first of said two (2) original data symbols by a selection from the group consisting of: (said initial sequence of N code elements, and said modified initial code comprising a sequence of N code elements when it is available), present in said means for containing N code elements, to provide a sequence of N first data symbol chips. Next a code element is derived from said first of said two (2) original data symbols and entering it to said input code element containing means in said means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements, to provide a new sequence of N code elements. Said code elements can optionally be applied to said pseudo-random sequence of numbers to provide a modified new sequence of N code elements. The sequentially second of said two (2) original data symbols is then multiplied by a selection from the group consisting of: (said new sequence of N code elements and, said modified new sequence of N code elements where it is available), present in the means for containing N code elements to provide a sequence of N data symbol chips for said sequentially next of said two (2) original data symbols. The end result being that a sequence of two (2) self-encoded spread spectrum data symbols are developed, each being comprised of a sequence of N data symbol chips.

In a general sense the present invention is a method of encoding a sequence of M original data symbols into a sequence of M self-encoded symbols. A more general present invention method comprises providing a first encoding sequence, followed by applying said first encoding sequence to the first of said sequence of M original data symbols to provide a first self-encoded symbol. This is followed by sequentially performing the following steps for each of the remaining second through (M−1) original data symbols:

A. deriving a new encoding sequence using a selection from the group consisting of:
1. said first encoding sequence and at least one previously determined self-encoded data symbol, and
2. at least one previously encoded original data symbol(s) as present prior to self-encoding, but which has/have already been encoded, and a selection from the group consisting of:
said first encoding sequence; and at least one previously determined self-encoded data symbol(s); and
3. said first encoding sequence and a selection from the group consisting of:
at least one previously determined self-encoded data symbol(s); and
at least one original data symbol(s) as present prior to self-encoding, but which has/have already been encoded; and
4. for the M−2 original data symbol and thereafter, at least two original data symbol(s) as present prior to self-encoding, but which has/have already been encoded;

B. applying said new encoding sequence to the sequentially next of said remaining (M−1) original data symbols to provide a sequentially next self-encoded data symbol.

The end result of practicing said method is that a sequence of M self-encoded data symbols is developed.

A modified method of encoding a sequence of M original data symbols into a sequence of M self-encoded symbols involves combining the just recited approach to self-encoding in combination with application of the results thereof to a pseudo-random sequence of numbers begins with generating a pseudo-random sequence of numbers. This is followed by providing a first encoding sequence and applying said first encoding sequence to the psuedo-random sequence of numbers to generate a the first modified encoding sequence. Then said first modified encoding sequence is applied to a first of said sequence of M original data symbols to provide a first self-encoded symbol. This is sequentially followed by performing the following steps for each of the remaining second through (M−1) original data symbols:

A. deriving a new modified encoding sequence by applying a new encoding sequence to said psuedo-random number sequence, said new encoding sequence being derived using a selection from the group consisting of:
1. said first encoding sequence and at least one previously determined self-encoded data symbol, and
2. at least one previously encoded original data symbol(s) as present prior to self-encoding, but which has/have already been encoded, and a selection from the group consisting of:
said first encoding sequence and at least one previously determined self-encoded data symbol(s); and
3. said first encoding sequence and a selection from the group consisting of:
at least one previously determined self-encoded data symbol(s), and at least one original data symbol(s) as present prior to self-encoding, but which has/have already been encoded; and
4. for the M−2 original data symbol and thereafter, at least two original data symbol(s) as present prior to self-encoding, but which has/have already been encoded;

B. applying said new modified encoding sequence to the sequentially next of said remaining (M-1) original data symbols to provide a sequentially next self-encoded symbol;

The end result is that a sequence of M self-encoded data symbols is developed.

It is specifically disclosed that in the preferred embodiment of the present invention, each sequential original data symbol sets an encoding sequence, (eg. a sequence of N code elements), which is utilized to encode and decode the next sequential original data symbol. For instance, a provided first encoding sequence is utilized to encode a first original data symbol, then the first original data symbol is utilized to reset said first provided encoding sequence, and said reset first encoding sequence is utilized to encode the second original data symbol, and so on.

To develop the dynamic encoding sequence code the present invention utilizes a code element containing means with provision for containing N code elements. Functionally this is realized preferably as a fixed length shift register having operational characteristics which provide that the entering of a code element at the input thereof, causes the shifting of a code element present in any code element containing means thereof, into an adjacent code element containing means, toward an output code element containing means. This is accompanied by the ejection of a code element present in said output code element containing means.

A preferred method of converting each of a series of M original data symbols into a string of M self-encoded spread spectrum data symbols, each thereof being comprised of a sequence of N data symbol chips, can be more specifically described as comprising the providing of a sequence of M original data symbols comprising a first data symbol followed by a sequential plurality of (M−1) additional original data symbols. This is accompanied with providing a means for containing N code elements. Said means for containing N code elements has an input code element containing means and an output code element containing means with (N−2) additional code element containing means being sequentially present there-in-between. Said means for containing N code elements is initially loaded with an initial code comprising a sequence of N code elements, one said code element being present in each of said N code element containing means. Said means for containing N code elements is capable of shifting a code element present in a code element containing means into an adjacent code element containing means toward said output code element containing means, and ejecting a code element present in said output code element containing means. Said preferred method then provides for multiplying the first of said M original data symbols by said initial N code elements present in said means for containing N code elements, to provide a sequence of N first data symbol chips. A code element is then derived from said first of said M original data symbols and entered to said input code element containing means in said means for containing N code elements, with consequent shifting of all code elements in each of said N code element containing means in said means for containing N code elements one position toward said output code element containing means in said means for containing N code elements. This is accompanied by ejection of the code element present in said output code element containing means in said means for containing N code elements. Next the following steps are performed for each of the remaining second through (M−1) original data symbols:

A. multiplying the sequentially next of said M original data symbols by code elements present in the means for containing N code elements to provide a sequence of N data symbol chips for said sequentially next of said M original data symbols; and B. deriving a code element from said sequentially next of said M original data symbols and entering it to said input code element containing means of said means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements.

The end result is that a sequence of M self-encoded spread spectrum data symbols is developed, each being comprised of a sequence of N data symbol chips.

The present invention then provides that the N data symbol chips for each of said M developed self-encoded spread spectrum data symbol be transmitted and received, as can be accomplished by any known communication system means with sufficient bandwidth. A received sequence of M self-encoded spread spectrum data symbols is then re-constituted into a sequence of M original data symbols.

A preferred method of re-constituting said sequence of M original data symbols from the received transmitted developed sequence of M self-encoded spread spectrum data symbols comprises providing a second means for containing N code elements, said second means for containing N code elements having an input code element containing means and an output code element containing means with (N−2) additional code element containing means being sequentially present there-in-between. Said second means for containing N code elements is initially loaded with said initial sequence of N code elements, one said code element being present in each of said N code element containing means. Said second means for containing N code elements is capable of shifting a code element present in a code element containing means into an adjacent code element containing means toward said output code element containing means, and ejecting a code element present in said output code element containing means. Next, the N data symbol chips of the first of said M self-encoded spread spectrum data symbols are multiplied by corresponding code elements present in said initial code present in said second means for containing N code elements, and sequentially integrating the results to provide a re-constituted first data symbol. Next, a code element is derived from said first re-constituted data symbol and entered to said input code element containing means in said second means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements. This is followed by sequentially performing the following steps for each of the remaining second through (M−1) self-encoded spread spectrum data symbols:

A. multiplying the N data symbol chips of the sequentially next of said M self-encoded spread spectrum data symbol by corresponding code elements present in the means for containing N code elements and sequentially integrating the results to provide a next of said re-constituted M original data symbols; and B. deriving a code element from said next of said re-constituted M original data symbols provided in step A. and entering it to said input code element containing means of said second means for containing N code elements, with consequent shifting of all code elements in each of said N code element containing means in said second means for containing N code elements one position toward said output code element containing means in said second means for containing N code elements, accompanied by ejection of the code element present in said output code element containing means in said means for containing N code elements.

The end result is that a sequence of M re-constituted original data symbols is developed.

In view of the foregoing, it can be appreciated that a complete preferred method of achieving communication utilizing the present invention then can comprise the steps of:

1. by a present invention method providing a sequence of M self-encoded spread spectrum data symbols, each being comprised of a sequence of N data symbol chips;
2. transmitting said N data symbol chips for each of said M developed self-encoded spread spectrum data symbols;
3. receiving said transmitted N data symbol chips for each of said M developed self-encoded spread spectrum data symbols;
4. re-constituting said sequence of M original data symbols from the received transmitted developed sequence of N data chips for each of the transmitted M self-encoded spread spectrum data symbols by a present invention method.

It is noted that, typically, the steps of:

2. transmitting said N data symbol chips for each developed self-encoded spread spectrum data symbols; and
3. receiving said transmitted N data symbol chips for each developed self-encoded spread spectrum data symbols;

are, for each self-encoded spread spectrum data symbol in said sequence of M self-encoded spread spectrum data symbols, performed essentially immediately after development of said N data symbol chips for an original data symbol to provide "real-time" operation.

It is to be understood that the term "multiply" was used in the foregoing to describe application of a N code elements to an original data symbol, or to N data symbol chips. Said terminology is typically utilized where data chips are +1, −1 or 0. For the purposes of this Disclosure, it is to be understood that the term "multiply" is to be interpreted to also include the situation where data chips are different frequencies, (ie. in frequency-division-multiple-access (FDMA) such as frequency hopping systems).

It is, of course, to be assumed that any method of the present invention can be practiced in two-way systems as well as one-way systems as described. That is, a terminal at which is present a transmitter can also have present a receiver, and a terminal at which is present a receiver and also have present a transmitter.

It is to be understood that, as the terminology is used herein, a data symbol chip can be a +1, −1 or 0, or can be a sequence of frequencies.

It is further noted that the degree of security of operation against unauthorized access to information communicated utilizing the present invention depends upon the degree of randomness present in a sequence of original data symbols. In this light it is disclosed that data compression techniques can serve to make a series of raw data symbols more random by removing redundant content therefrom. The present invention therefore includes in its scope the application of data compression techniques to a sequence of original raw data, to provide a sequence of M original data symbols.

It is also noted that practice of the technique known as "Forward Error Correction Coding" in combination with the present invention method is within the scope of the present invention.

The present invention approach to self-encoding a sequence of original data symbols can also be viewed as comprising an encryption scheme.

The present invention also comprises systems which practice the described method.

The present invention will be better understood by referenced to the Detailed Description Section of this Disclosure in conjunction with the accompanying drawings.

SUMMARY OF THE INVENTION

It is a primary purpose of the present invention to teach a method for transforming a series of M original data symbols into a sequence of M "self-encoded" spread spectrum data symbols, each of which is comprised of a sequence of N data symbol chips.

It is another purpose of the present invention to provide that each encoded data symbol in said sequence of M "self-encoded" spread spectrum data symbols, be developed by application of a code, which code depends on original data symbols in a sequence of original data symbols which preceded an original data symbol being encoded.

It is yet another purpose of the present invention to provide that each encoded data symbol in said sequence of M "self-encoded" spread spectrum data symbols, developed by application of a code, be de-coded by a method which depends on original data symbols in a sequence of original data symbols which preceded an original data symbol being encoded.

It is another purpose yet of the present invention to provide a new method for securing wireless transmission of digital information.

DETAILED DESCRIPTION

In spread-spectrum communication systems, (eg. CDMA) systems), digital information is sent from a transmitter to a receiver utilizing a transmission signal which varies at a much faster rate than does the information signal. The transmission signal is deterministic, but is carefully chosen so that it appears random, or otherwise stated, noise-like, (eg. pseudo-noise (PN)), to an unauthorized receiver. Said pseudo-noise (PN) spreading signal, (ie. code), is, however, made known at an authorized receiver, thereby enabling accurate decoding. Message security, it should be appreciated, is thus provided by signal waveform encoding rather than by data encryption, although the distinction is a bit artificial.

It is noted that the well known Shannon theory suggests that information theoretic waveforms in a noisy communication channel should also appear "noise-like", (ie. truly random). The present invention method provides such a waveform, particularly where data compression techniques are applied to a sequence of original data symbols prior to entry to an encoding means, such that the resulting compressed sequence approaches a truly random progression. In comparison, conventional pseudo-noise (PN) codes are developed by pseudo-random (PN) number generator expansion of a key input thereto, and it is to be appreciated that the result of said expansion is not a truly random sequence.

Figure 1:
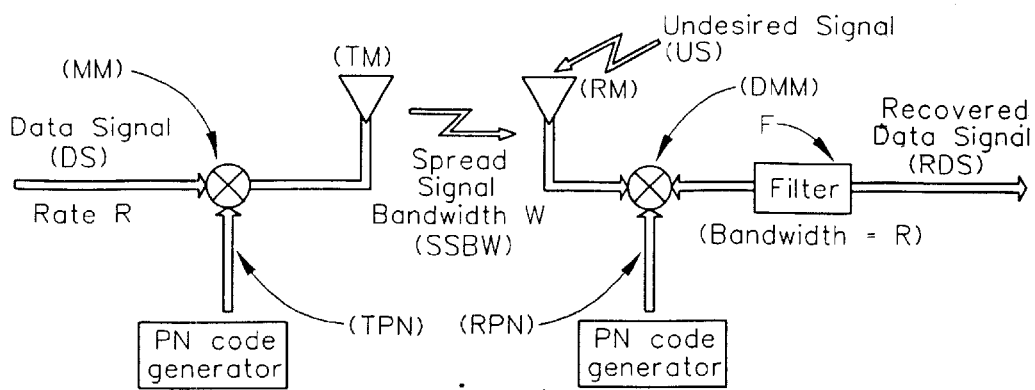
FIG. 1, shows a conventional direct sequence spread-spectrum system.

Turning now to FIG. 1, there is shown a conventional direct sequence spread-spectrum system. Note that a data signal (DS) is shown as input to modulation means (MM) at a rate (R) along with input from a (PN) code generator (TPN). Note that the resulting modulated signal is transmitted by transmitter means (TM) as a spread-spectrum signal (SSBW) of bandwidth (W), and is received by receiver means (RM) along with undesired signal (US). The received combination of the transmitted spread-spectrum signal (SSBW) of bandwidth (W) and undesired signal (US) is then subjected to demodulation by demodulation means (DMM) utilizing a signal from the receiver side pseudo-noise generator (RPN). The resulting demodulated signal being entered to a filter (F), which presents with a bandwidth of approximately (R), (the original data signal (DS) rate). Where the pseudo-random code generators at the input (TPN) and output (RPN) are set to produce the same pseudo-random sequence codes, and are synchronized, the end result is recovery of the recovered data signal (DS) at the output of said filter (F), as recovered data signal (RDS). It is of primary importance to note that equivalent, synchronized, pseudo-noise generators (TPN) & (RPN) are applied at both the transmitter and receiver sides in FIG. 1.

Figure 2:
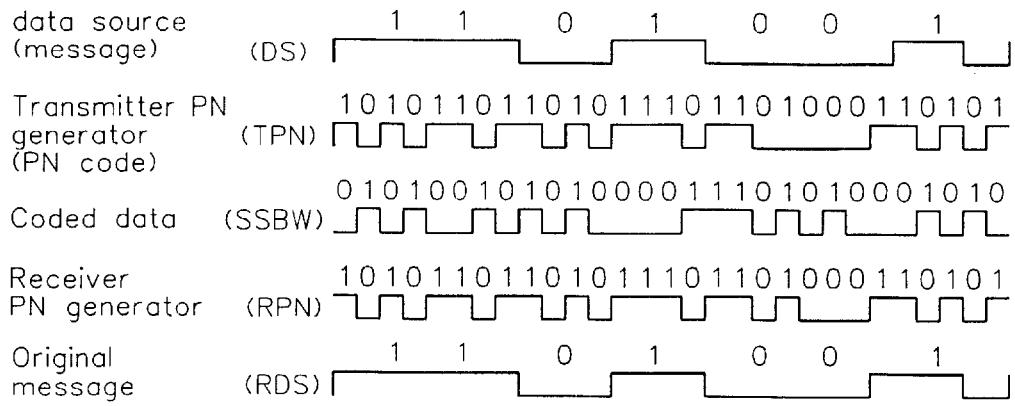
FIG. 2 demonstrates signals at various stages in the application of the FIG. 1 conventional direct sequence spread-spectrum system which utilizes pseudo-noise (PN) code generators.

FIG. 2 demonstrates signals at various stages in the application of the FIG. 1 conventional direct sequence spread-spectrum system which utilizes pseudo-noise (PN) code generators. The top-most signal in FIG. 2 is a data signal (DS) input to the FIG. 1 system modulator means (MM). The vertically second-most signal in FIG. 2 is a generated transmitter side pseudo-noise (PN) signal. The vertically third-most signal in FIG. 2 is a coded signal output from the transmitter side modulator means (MM), which vertically third-most signal is transmitted by transmitter means (TM), and received by receiver means (RM) along with the undesired signal (US), (not shown in FIG. 2). The receiver side pseudo-noise (PN) signal is shown as the vertically forth-most signal in FIG. 2, and the recovered data signal (RDS) at the output of the receiver side of the FIG. 1 system is shown as the vertically fifth-most signal in FIG. 2.

Figure 3:
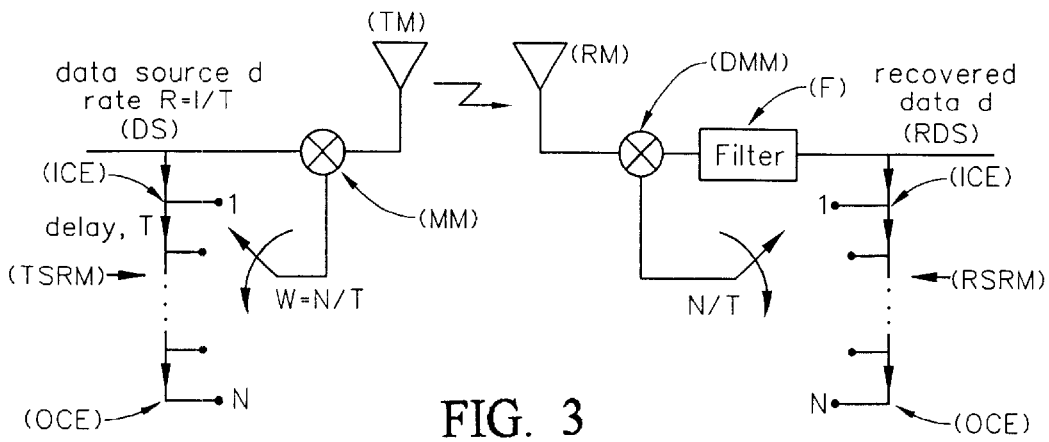
FIG. 3 shows the essence of what distinguishes the system of the present invention over conventional direct sequence spread-spectrum systems.

FIG. 3 shows the essence of what distinguishes the system of the present invention over the just described conventional direct sequence spread-spectrum system. Where FIG. 1 shows pseudo-noise generators (TPN) and (RPN) feeding into modulator means (MM) and demodulator means (DMM) respectively, FIG. 3 shows, in place of each of said (TPN) and (RPN) pseudo-noise generators, a means for containing N code elements (ie. (TSRM) and (RSRM). Each shown means for containing N code elements (TSRM) and (RSRM) has an input code element containing means (ICE) and an output code element containing means (OCE) with (N−2) additional code element containing means being sequentially present there-in-between. As described in the Disclosure of the Invention Section of this Specification, each said means for containing N code elements (TSRM) and (RSRM) are initially loaded with an initial code comprising a sequence of N code elements, one said code element being present in each of said N code element containing means, (1 . . . N). Further each said means for containing N code elements (TSRM) and (RSRM) is capable of shifting a code element present in a code element containing means into an adjacent code element containing means toward said output code element containing means (OCE), and ejecting a code element present in said output code element containing means (OCE). That is, each of said (TSRM) and (RSRM) is a shift register. FIG. 3 shows that data symbols are input to said modulator means (MM) in FIG. 3 at a rate of (R). As also described in the Disclosure of the Invention Section of this Specification, each of (TSRM) and (RSRM) are initially loaded with the same sequence of N elements. After each data symbol is input to said modulator means (MM) a code element is derived therefrom and then entered to said input code element containing means (ICE) in said means for containing N code elements (TSRM), with consequent shifting of all code elements in each of said N code element containing means in said means for containing N code elements one position toward said output code element containing means (OCE) in said means for containing N code elements (TSRM), accompanied by ejection of the code element present in said output code element containing means in said means for containing N code elements (TSRM). The resulting signal is then transmitted to the receiver means (RM) and fed to the present invention system demodulator means (DMM). As further described in the Disclosure of the Invention Section of this Specification, the method of re-constituting said sequence of M original data symbols from the received transmitted developed sequence of M self-encoded spread spectrum data symbols comprises multiplying the N data symbol chips of the first of said M self-encoded spread spectrum data symbols by corresponding code elements present in said initial code present in said second means for containing N code elements (RSRM), and sequentially integrating the results in the filter (F) shown in FIG. 3, to provide a re-constituted first original data symbol. Then a code element is derived from said first re-constituted original data symbol and entered to said input code element containing means (ICE) in said second means for containing N code elements (RSRM), with consequent shifting of all code elements in each of said N code element containing means in said means for containing N code elements one position toward said output code element containing means (RSRM) in said means for containing N code elements, accompanied by ejection of the code element present in said output code element containing means (OCE) in said means for containing N code elements (OCE). Said procedure is repeated for each sequential data symbol input to said modulator means (MM). The end result is that a sequence of M re-constituted original data symbols are developed.

To expand, at the transmitter side in FIG. 3, N-tap shift register (TSRM) contents, (ie. the code length is N), having been initially set, are constantly updated with receipt of each new data symbol (DS). Data received at the receiver side in FIG. 3 are fed to a receiver side N-tap shift register (RSRM), and integration in the filter (N) leads to reconstruction of said code. Because the data are constantly changing the constructed codes are un-correlated. And, unless the initially present data in both (TSRN) and (RSRM) are synchronized, it is extremely unlikely that decoding of sequentially transmitted data symbols will be accomplished. That is, unauthorized receiver access to decoded transmitted data approaches the impossible.

For frequency hopping systems the hopping codes are obtained from the digital data in a similar manner, and said hopping codes approach being truly random.

As an analogy, the present invention can be likened to "cock-tail" party attendees attempting to communicate where the language used changes every time a word is spoken, based upon what word is spoken.

It should be appreciated then that, unless system errors occur, code initializations are required only at the start of conversations, which can be mediated by use of encryption keys. go Also, interference is completely un-correlated even among speakers that began conversations in the same language. This has correlation mitigating effects in asynchronous operations which use (PN) codes. Where noise, interference, propagation fading, burst errors and the like cause miswords it will, however, be necessary to effect error correction and reset initialization.

In (CDMA) applications, the data from subscribers are independent from one another and self-encoded spread spectrum signals from different subscribers are un-correlated. That is, the number of subscribers is not affected by self-encoding, as is the case with psuedo-random coding. As well, the problems associated with variable data rates are greatly mitigated because the spreading waveforms from different subscribers are un-correlated. The randomness of self-encoding allows each subscriber to transmit asychronously at his or her own symbol rate and chip length (N).

Continuing, as recited in the Disclosure of the Invention Section of this Specification, and again recited here for emphasis, the significant aspect of present invention method which distinguishes it over all known prior art, can be easily understood utilizing an example where two (2) original data symbols (DS) are transforming into a sequence of two (2) self-encoded spread spectrum data symbols, each of which is comprised of a sequence of N data symbol chips. Said method comprises the steps of:

a. providing a sequence of two (2) original data symbols (DS) comprising a first data symbol followed by a sequentially second original data symbol;

b. providing a means for containing N code elements (TSRM), said means for containing N code elements (TSRM) having an input code element containing means (ICE) and an output code element containing means (OCE) with (N−2) additional code element containing means being sequentially present there-in-between, said means for containing N code elements being initially loaded with an initial code comprising a sequence of N code elements, one said code element being present in each of said N code element containing means, said means for containing N code elements being capable of shifting a code element present in a code element containing means into an adjacent code element containing means toward said output code element containing means (OCE), and ejecting a code element present in said output code element containing means (OCE);

c. multiplying the first of said two (2) original data symbols by said initial N code elements present in said means for containing N code elements (ICE), to provide a sequence of N first data symbol chips;

d. deriving a code element from said first of said two (2) original data symbols and entering it to said input code element containing means (ICE) in said means for containing N code elements, with consequent shifting of all code elements in each of said N code element containing means in said means for containing N code elements one position toward said output code element containing means (OCE) in said means for containing N code elements, accompanied by ejection of the code element present in said output code element containing means (OCE) in said means for containing N code elements; and f. multiplying the sequentially second of said two (2) original data symbols by code elements present in the means for containing N code elements to provide a sequence of N data symbol chips for said sequentially next of said two (2) original data symbols; and The end result of practicing said method is that a sequence of two (2) self-encoded spread spectrum data symbols are developed, each being comprised of a sequence of N data symbol chips. Of course, decoding of said two (2) self-encoded spread spectrum data symbols involves utilizing the original code to decode the first of said two (2) data symbols, and reconstructing the code utilized to encode the second element, (which was developed based upon the content of the first data symbol), at the receiver means, and applying said reconstructed code to decode said second data symbol.

Figure 4:
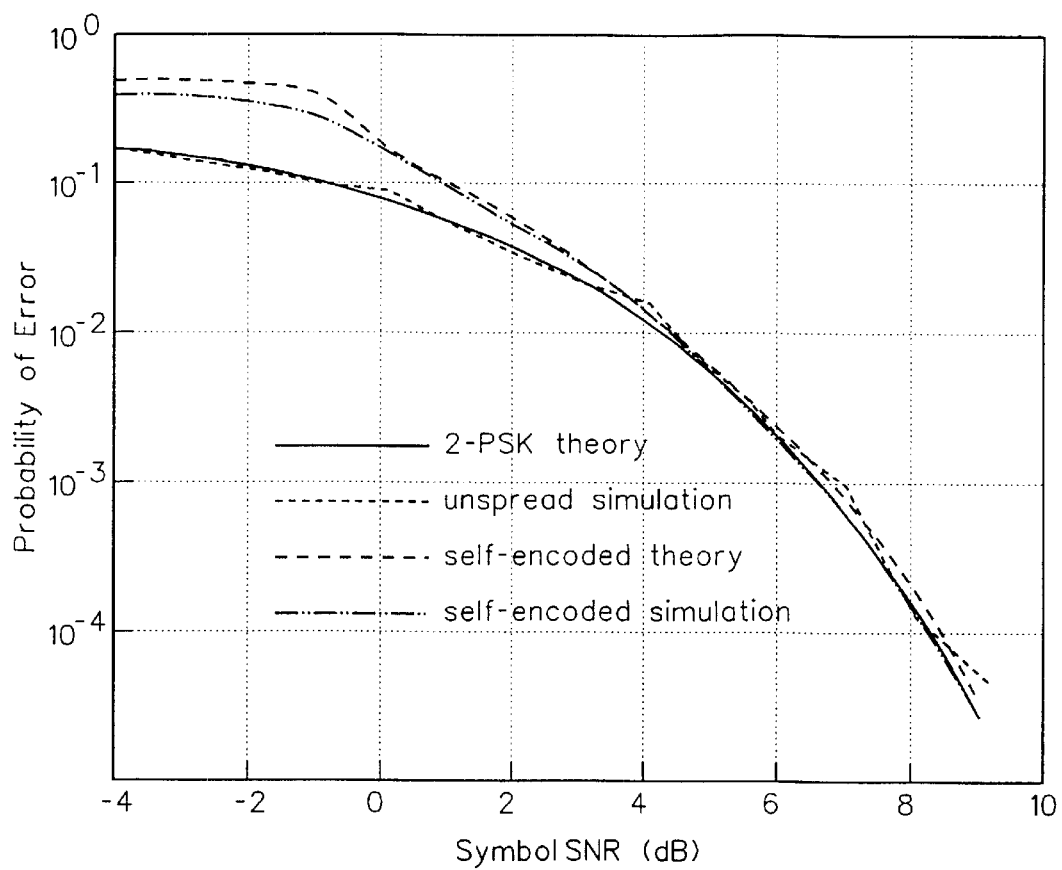
FIG. 4 shows a probability of error performance of a self-encoded spread-spectrum system, as a function of signal-to-noise ratio.

Turning now to FIG. 4, there is shown a probability of error performance of a present invention self-encoded spread spectrum system. FIG. 4 compares 2-PSK theory, unspread simulation, self-encoded theory and self-encoded simulation as a function of Signal-to-Noise (SNR) ratio in decibels.

It is noted that the number of data symbol chips (N) used to encode a data symbol, is preferably chosen to be less than (1/BER), where (BER) is the Bit-Error-Rate expected. This means that the receiver's estimate of the spreading code is reliable and reduces the probability of burst chip errors while increasing the probability of recovery from chip errors. N also has to be sufficiently large so that the signal degradation from chip errors is negligible. The effect of chip errors can be modeled as self-interference introduced by self-coding. The reduction in signal strength, or signal-to-noise ratio (SNR), is given by:

$$A = 20\log\left(1 - \frac{2n}{N}\right) dB,$$

where n is the number of chip errors in the receiver's delay register. Thus average (SNR) degradation due to (BER) can be expressed as:

$$A=20\log(1-2BER)dB.$$

This allows estimating the (BER) degradation to self-encoding. As an example, for a processing gain of 30 dB or N=1000, the average performance degradation in a AWGN channel is negligible at BER=$10^{-5}$ or less (9.5 dB SNR). Preliminary results of the average (BER) analysis is what is shown in FIG. 4. There is little degradation in the average (BER) performance for (SNR) greater then 4 dB.

It is noted that while perhaps not conventional, in the Claims, the term "chip" or "chips" is to be interpreted to include application to the results of practicing code-division-multiple-access (CDMA) or frequency-division-multiple-access (FDMA), or other functionally similar encoding. Additionally, the term "multiplying" in the context of "multiplying the first of said M original data symbols by said initial N code elements present in said means for containing N code elements, to provide a sequence of N first data symbol chips", is to be interpreted to describe the results of a procedure which produces spread-spectrum amplitude chips or frequence chips or functionally similar energy spreading chips. Said terminology definition is prescribed to reduce the number of Claims required to cover the present invention. It is specifically stated that the present invention is applicable in frequency-hopping, time-hopping, codedivision-multiple-access systems, (ie. in any spread-spectrum system).

It is also specifically pointed-out that while FIGS. 1 and 3 demonstrate application of the present invention in a radio-frequency transmission setting, said FIGS. 1 and 3 should be interpreted sufficiently broadly to include systems which utilize any range of frequencies and any transmission media, including the atmosphere, wire and fiber optics etc.

Finally, it is to be understood that the present invention has primary application in (CDMA) communications systems. However, the method of the present invention might also find application in other type communication systems, and where applicable or obviated, the Claims should be interpreted to be sufficiently encompassing to include application in said other type communication systems.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A method of transforming a series of M original data symbols into a sequence of M self-encoded spread spectrum data symbols, each of which is comprised of a sequence of N data symbol chips, where N and M are both arbitray integers, comprising the steps of:
    a. providing a sequence of M original data symbols comprising a first data symbol followed by a sequential plurality of (M−1) additional original data symbols;
    b. providing a means for containing N code elements, said means for containing N code elements having an input code element containing means and an output code element containing means with (N−2) additional code element containing means being sequentially present there-in-between, said means for containing N code elements being initially loaded with an initial code comprising a sequence of N code elements, one of said N code elements being present in each of said N code element containing means, said means for containing N code elements being capable of shifting a code element present in a code element containing means into an adjacent code element containing means toward said output code element containing means, and ejecting a code element present in said output code element containing means;
    c. multiplying the first of said M original data symbols by said initial N code elements present in said means for containing N code elements, to provide a sequence of N first data symbol chips;
    d. deriving a code element from said first of said M original data symbols and entering it to said input code element containing means in said means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements; and
    e. sequentially performing the following steps f. and g. for each of the remaining second through (M−1) original data symbols:
        f. multiplying the sequentially next of said M original data symbols by code elements present in the means for containing N code elements to provide a sequence of N data symbol chips for said sequentially next of said M original data symbols; and
        g. deriving a code element from said sequentially next of said M original data symbols and entering it to said input code element containing means of said means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements;
    to the end that the sequence of M self-encoded spread spectrum data symbols is developed, wherein each self-encoded spread spectrum data symbol is comprised of the sequence of N data symbol chips.

2. A method of transforming a series of M original data symbols into a sequence of M self-encoded spread spectrum data symbols as in claim 1, further comprising the step of transmitting said N data symbol chips for each of said M developed self-encoded spread spectrum data symbols.

3. A method of transforming a sequence of M original data symbols into a sequence of M self-encoded spread spectrum data symbols as in claim 2, further comprising the step of receiving said transmitted N data symbols chips for each of said M developed self-encoded spread spectrum data symbols.

4. A method of transforming a sequence of M original data symbols into a sequence of M self-encoded spread spectrum data symbols as in claim 3, further comprising the step of re-constituting a sequence of M original data symbols from the received transmitted developed sequence of self-encoded spread spectrum data symbols.

5. A method of transforming a sequence of M original data symbols into a sequence of M self-encoded spread spectrum data symbols as in claim 4, wherein the step of re-constituting the sequence of M original data symbols from the received transmitted developed sequence of M self-encoded spread spectrum data symbols comprises the steps of:
    a. providing a second means for containing N code elements, said second means for containing N code elements having an input code element containing means and an output code element containing means with (N−2) additional code element containing means being sequentially present there-in-between, said second means for containing N code elements being initially loaded with said initial sequence of N code elements, one of said N code elements being present in each of said N code element containing means, said second means for containing N code elements being capable of shifting a code element present in a code element containing means into an adjacent code element containing means toward said output code element containing means, and ejecting a code element present in said output code element containing means;
    b. multiplying the N data symbol chips of the first of said M self-encoded spread spectrum data symbols by corresponding code elements present in said initial code present in said second means for containing N code elements, and sequentially integrating the results to provide a re-constituted first original data symbol;
    c. deriving a code element from said first re-constituted original data symbol and entering it to said input code element containing means in said second means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements; and d. sequentially performing the following steps e. and f. for each of the remaining second through (M−1) self-encoded spread spectrum data symbols:

e. multiplying the N data symbol chips of the sequentially next of said M self-encoded spread spectrum data symbol by corresponding code elements present in the means for containing N code elements and sequentially integrating the results to provide a next of said re-constituted M original data symbols; and f. deriving a code element from said next of said re-constituted M original data symbols provided in step e. and entering it to said input code element containing means of said second means for containing N code elements, with consequent shifting of all code elements in each of said N code element containing means in said second means for containing N code elements one position toward said output code element containing means in said second means for containing N code elements, accompanied by ejection of the code element present in said output code element containing means in said means for containing N code elements;

to the end that the sequence of M re-constituted original data symbols is developed.

6. A method of communication comprising the steps of:

A. transforming a sequence of M original data symbols into a sequence of M self-encoded spread spectrum data symbols which each comprises N data symbol chips, where N and M are both arbitray integers, said method comprising the steps of:

a. providing the sequence of M original data symbols comprising a first data symbol followed by a sequential plurality of (M−1) additional original data symbols;

b. providing a means for containing N code elements, said means for containing N code elements having an input code element containing means and an output code element containing means with (N−2) additional code element containing means being sequentially present there-in-between, said means for containing N code elements being initially loaded with an initial code comprising a sequence of N code elements, one of said N code elements being present in each of said N code element containing means, said means for containing N code elements being capable of shifting a code element present in a code element containing means into an adjacent code element containing means toward said output code element containing means, and ejecting a code element present in said output code element containing means;

c. multiplying the first of said M original data symbols by said initial N code elements present in said means for containing N code elements, to provide a sequence of N first data symbol chips;

d. deriving a code element from said first of said M original data symbols and entering it to said input code element containing means in said means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements; and e. sequentially performing the following steps f. and g. for each of the remaining second through (M−1) original data symbols:

f. multiplying the sequentially next of said M original data symbols by code elements present in the means for containing N code elements to provide a sequence of N data symbol chips for said sequentially next of said M original data symbols; and g. deriving a code element from said sequentially next of said M original data symbols and entering it to said input code element containing means of said means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements;

to the end that the sequence of M self-encoded spread spectrum data symbols are developed, each being comprised of a sequence of N data symbol chips;

B. transmitting said N data symbol chips for each of said M developed self-encoded spread spectrum data symbols;

C. receiving said transmitted N data symbol chips for each of said M developed self-encoded spread spectrum data symbols;

D. re-constituting said sequence of M data symbols from the received transmitted developed sequence of N data chips for each of the transmitted M self-encoded spread spectrum data symbols by the steps of:

a. providing a second means for containing N code elements, said second means for containing N code elements having an input code element containing means and an output code element containing means with (N−2) additional code element containing means being sequentially present there-in-between, said second means for containing N code elements being initially loaded with said initial sequence of N code elements, one of said N code elements being present in each of said N code element containing means, said second means for containing N code elements being capable of shifting a code element present in a code element containing means into an adjacent code element containing means toward said output code element containing means, and ejecting a code element present in said output code element containing means;

b. multiplying the N data symbol chips in the first of said M self-encoded spread spectrum data symbols by corresponding initial code elements present in said second means for containing N code elements and sequentially integrating the results to provide a re-constituted first original data symbol;

c. deriving a code element from said first re-constituted original data symbol and entering it to said input code element containing means in said second means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements; and d. sequentially performing the following steps e. and f. for each of the remaining second through (M-1) self-encoded spread spectrum data symbols:

e. multiplying the N data symbol chips of the sequentially next of said M self-encoded spread spectrum data symbol by corresponding code elements present in the means for containing N code elements and sequentially integrating the results to provide a next of said re-constituted M original data symbols; and f. deriving a code element from said next of said re-constituted M original data symbols provided in step e. and entering it to said input code element containing means of said second means for containing N code elements, with consequent shifting of all code elements in each of said N code element containing means in said second means for containing N code elements one position toward said output code element containing means in said second means for containing N code elements, accompanied by ejection of the code element present in said output code element containing means in said means for containing N code elements;

to the end that the sequence of M re-constituted original data symbols are developed.

7. A method of communication as in claim 6, in which the steps of:

B. transmitting said N data symbol chips for each developed self-encoded spread spectrum data symbol; and C. receiving said transmitted N data symbol chips for each developed self-encoded spread spectrum data symbol;

are, for each self-encoded spread spectrum data symbol in said sequence of M self-encoded spread spectrum data symbols, performed essentially immediately after development of said N data symbol chips for a data symbol.

8. A method of encoding a sequence of M original data symbols into a sequence of M self-encoded spread spectrum data symbols, where N and M are both arbitray integers, comprising the steps of:

a. providing a first encoding sequence;

b. applying said first encoding sequence to the first of said sequence of M original data symbols to provide a first self-encoded symbol;

c. sequentially performing the following steps d. and e. for each of the remaining second through (M-1) original data symbols:

d. deriving a new encoding sequence using a selection from the group consisting of:

A. said first encoding sequence; and at least one previously determined self-encoded data symbol; and B. at least one previously encoded original data symbols as present prior to self-encoding, but which already encoded, and a selection from the group consisting of:

said first encoding sequence and at least one previously determined self-encoded data symbols; and C. said first encoding sequence and a selection from the group consisting of:

at least one previously determined self-encoded data symbols; and at least one original data symbols as present prior to self-encoding, but which was alrady encoded; and D. for the M-2 original data symbol and thereafter, at least two original data symbols as present prior to self-encoding, but which were already encoded;

e. applying said new encoding sequence to the sequentially next of said remaining (M-1) original data symbols to provide a sequentially next self-encoded data symbol;

to the end that the sequence of M self-encoded spread spectrum data symbols is developed, wherein each self-encoded spread spectrum data symbol is comprised of a sequence of N data symbol chips.

9. A method of encoding a sequence of M original data symbols into a sequence of M self-encoded symbols comprising the steps of:

a. generating a pseudo-random sequence of numbers;

b. providing a first encoding sequence;

c. applying said first encoding sequence to the psuedo-random sequence of numbers to generate a first modified encoding sequence;

d. applying said first modified encoding sequence to a first of said sequence of M original data symbols to provide a first self-encoded data symbol;

e. sequentially performing the following steps f. and g. for each of the remaining second through (M-1) original data symbols:

f. deriving a new modified encoding sequence by applying a new encoding sequence to a pseudo-random number sequence, said new encoding sequence being derived using a selection from the group consisting of:

A. said first encoding sequence; and at least one previously determined self-encoded data symbol; and B. at least one previously encoded original data symbol as present prior to self-encoding, but which was already encoded, and a selection from the group consisting of:

said first encoding sequence and at least one previously determined self-encoded data symbol; and C. said first encoding sequence and a selection from the group consisting of:

at least one previously determined self-encoded data symbol; and at least one original data symbol as present prior to self-encoding, but which was already encoded; and D. for the M-2 original data symbol and thereafter, at least two original data symbols as present prior to self-encoding, but which were already encoded;

g. applying said new modified encoding sequence to the sequentially next of said remaining (M-1) original data symbols to provide a sequentially next self-encoded data symbol;

to the end that the sequence of M self-encoded spread spectrum data symbols is developed, wherein each self-encoded spread spectrum data symbol is comprised of a sequence of N data symbol chips.

10. A method of transforming a series of two original data symbols into a sequence of two self-encoded spread spectrum data symbols, each of which is comprised of a sequence of N data symbol chips, where N is an arbitray integer, comprising the steps of:

a. providing a sequence of two original data symbols comprising a first original data symbol followed by a sequentially second original data symbol;

b. providing a means for containing N code elements, said means for containing N code elements having an input code element containing means and an output code element containing means with (N−2) additional code element containing means being sequentially present there-in-between, said means for containing N code elements being initially loaded with an initial code comprising a sequence of N code elements, one of said N code elements being present in each of said N code element containing means, said means for containing N code elements being capable of shifting a code element present in a code element containing means into an adjacent code element containing means toward said output code element containing means, and ejecting a code element present in said output code element containing means;

c. multiplying the first of said two original data symbols by said initial N code elements present in said means for containing N code elements, to provide a sequence of N first data symbol chips;

d. deriving a code element from said first of said two original data symbols and entering it to said input code element containing means in said means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements; and e. multiplying the sequentially second of said two original data symbols by code elements present in the means for containing N code elements to provide a sequence of N data symbol chips for said sequentially next of said two original data symbols;

to the end that the sequence of two self-encoded spread spectrum data symbols is developed, wherein each self-encoded spread spectrum data symbol is comprised of the sequence of N data symbol chips.

11. A method of transforming a series of two original data symbols into a sequence of two self-encoded spread spectrum data symbols, each of which is comprised of a sequence of N data symbol chips, where N is an arbitray integer, comprising the steps of:

a. providing a pseudo-random sequence of numbers;

b. providing a sequence of two original data symbols comprising a first original data symbol followed by a sequentially second original data symbol;

c. providing a means for containing N code elements, said means for containing N code elements having an input code element containing means and an output code element containing means with (N−2) additional code element containing means being sequentially present there-in-between, said means for containing N code elements being initially loaded with an initial code comprising a sequence of N code elements, one of said N code elements being present in each of said N code element containing means, said means for containing N code elements being capable of shifting a code element present in a code element containing means into an adjacent code element containing means toward said output code element containing means, and ejecting a code element present in said output code element containing means;

d. optionally applying said initial code comprising the sequence of N code elements to said pseudo-random sequence of numbers to provide a modified initial code comprising the sequence of N code elements;

e. multiplying the first of said two original data symbols by a selection from the group consisting of:
said initial sequence of N code elements; and
said modified initial code comprising the sequence of N code elements;
present in said means for containing N code elements, to provide a sequence of N first data symbol chips;

f. deriving a code element from said first of said two original data symbols and entering it to said input code element containing means in said means for containing N code elements, with consequent shifting of all code elements in each of said N code element containing means in said means for containing N code elements one position toward said output code element containing means in said means for containing N code elements, accompanied by ejection of the code element present in said output code element containing means in said means for containing N code elements, to provide a new sequence of N code elements;

g. optionally applying said new sequence of N code elements to said pseudo-random sequence of numbers to provide a modified new sequence of N code elements;

h. multiplying the sequentially second of said two original data symbols by a selection from the group consisting of:
said new sequence of N code elements; and
said modified new sequence of N code elements;
present in the means for containing N code elements to provide a sequence of N data symbol chips for said sequentially next of said two original data symbols;

to the end that the sequence of two self-encoded spread spectrum data symbols are developed, wherein each self-encoded spread spectrum data symbol is comprised of the sequence of N data symbol chips.

12. A method as in claims 1, 2, 3, 4, 5, 6, 7, 8, 9, 10 or 11 in which the sequence of M original data symbols is obtained by first applying data compression to a sequence of raw data symbols.

13. A method as in claims 1, 2, 3, 4, 5, 6, 7, 8, 9, 10 or 11, which includes the step of providing a spread-spectrum system which operates on a basis selected from the group consisting of:

a frequency-hopping system;

a time-hopping system; and a code-division-multiple-access system;

in which system said method is practiced;

said method comprising transmitting signals over a media selected from the group consisting of:
atmospheric;
wire; and
fiber optic.

* * * * *